(12) United States Patent
Okamoto et al.

(10) Patent No.: US 7,826,078 B2
(45) Date of Patent: Nov. 2, 2010

(54) IMAGE PROCESSING DEVICE AND IMAGE PROCESSING METHOD

(75) Inventors: Yuji Okamoto, Soraku-gun (JP); Atsuhiko Murakami, Nara (JP); Shuhji Fujii, Soraku-gun (JP); Toshihiro Yamanaka, Ikoma (JP); Shinsaku Tohki, Tenri (JP); Toshihiko Fukuhara, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1413 days.

(21) Appl. No.: 10/671,254

(22) Filed: Sep. 24, 2003

(65) Prior Publication Data

US 2004/0120004 A1 Jun. 24, 2004

(30) Foreign Application Priority Data

Sep. 26, 2002 (JP) .............................. 2002-280963

(51) Int. Cl.
 *G06F 15/00* (2006.01)
(52) U.S. Cl. .................... 358/1.15; 358/1.16; 358/1.18; 358/1.13; 358/1.14; 358/1.12; 358/1.17; 358/1.9; 358/1.1
(58) Field of Classification Search ....................... None
 See application file for complete search history.

(56) References Cited

U.S. PATENT DOCUMENTS

| | | | | |
|---|---|---|---|---|
| 5,523,859 A | * | 6/1996 | Nakajima et al. | 358/444 |
| 5,825,988 A | * | 10/1998 | Collard et al. | 358/1.13 |
| 6,285,459 B1 | * | 9/2001 | Koakutsu et al. | 358/1.15 |
| 6,559,967 B1 | * | 5/2003 | Akiba et al. | 358/1.16 |
| 6,639,687 B1 | * | 10/2003 | Neilsen | 358/1.14 |
| 6,745,334 B1 | * | 6/2004 | Ikegami | 726/19 |
| 7,019,852 B2 | * | 3/2006 | Morikawa | 358/1.13 |
| 7,170,622 B2 | * | 1/2007 | Nobuhara et al. | 358/1.15 |
| 7,230,731 B2 | * | 6/2007 | Dan et al. | 358/1.14 |
| 2001/0000360 A1 | * | 4/2001 | Shibata | 713/202 |
| 2001/0025343 A1 | * | 9/2001 | Chrisop et al. | 713/193 |
| 2002/0032703 A1 | * | 3/2002 | Gassho et al. | 707/527 |
| 2004/0012812 A1 | * | 1/2004 | Shimizu | 358/1.15 |

FOREIGN PATENT DOCUMENTS

JP 09-284572 * 10/1997

* cited by examiner

*Primary Examiner*—King Y Poon
*Assistant Examiner*—Pawandeep S Dhingra
(74) *Attorney, Agent, or Firm*—David G. Conlin; Steven M. Jensen; Edwards Angell Palmer & Dodge LLP (57) ABSTRACT

The subject invention offers data deletion operation with respect to the area storing image data for security purpose, and also offers a function for suspending the deletion operation by a specific condition so as to accept a request of processing new image data. The image processing device includes image data inputting means for inputting image data; image data storing means for storing the image data inputted by the image data inputting means; image data processing (outputting) means for processing (outputting) the image data stored in the image data storing means; image data invalidating (deleting) means for performing invalidation (deletion) of the image data stored in the image data storing means; directing means for directing cutoff of the invalidation performed by the image data invalidating means; and permitting means for permitting the cutoff of the invalidation directed by the directing means.

8 Claims, 8 Drawing Sheets

IMAGE PROCESSING DEVICE AND IMAGE PROCESSING METHOD

FIELD OF THE INVENTION

The present invention relates to an image processing device, such as a digital photocopier, including an image data input section (scanner device) and an image data output section (printer device), and is preferably also used as, in addition to the function as a photocopier, a digital multi-functional device having an image communication function and a printing function by being connected to a communication pathway, e.g. a network. Further, the present invention particularly relates to an image processing device and an image processing method for temporarily storing image data in a built-in image data storage section (storage device) for carrying out processing of inputted image data, and also for performing invalidation processing of the image data which has been processed, for example, by deleting the image data from the image data storage section (storage device).

BACKGROUND OF THE INVENTION

In recent years, there has been known a digital photocopier product which electronically scans a document image with a scanner device, and outputs the record of the image data thus supplied from the scanner device via a printer device. Such a digital photocopier has been lately developed into a digital multi-functional device which is capable of dealing with a network with a communication function (e.g. facsimile function, scanner function, printer function) for carrying out sending/receiving of image data to/from an external device. Further, such multi-function of the digital photocopier has been improved to be able to effectively process a large amount of image data and a plurality of jobs, by having a built-in storage section for temporarily storing image data.

Meanwhile, there are various types of storage device for storing image data, for example, one including a semiconductor memory or a hard disk device made up of a magnetic storage medium. These storage devices have different environments for storing image data, for example, they are differ in storage capacitance, costs, writing speed, reading speed, or volatility/non-volatility.

Particularly, in a magnetic storage medium such as a hard disk device, a disk (storage medium) is divided into small units by using a management data called FAT data so as to carry out control of each area of the units. Then, the FAT data is renewed when data is stored in the respective areas in the disk (storage medium), and the data stored in the respective areas are appropriately read out based on the FAT data.

Presently, because of its desirable storage capacitance, costs (cost of components), and data transfer speed, this type of hard disk device is mounted in a digital multi-functional device as an auxiliary storage device of a semiconductor memory. The hard disk device processes a certain amount of job data on the semiconductor memory, while temporarily storing newly supplied job data, and reading out the stored job data in turn onto the semiconductor memory for carrying out processing of the data. This processing system has been appearing on the market as an efficient image processing system (digital multi-functional device) for dealing with a large amount of job data without causing holdup of the data.

However, such a digital multi-functional device is disadvantageous in terms of security when handling a confidential document data. For example, the hard disk device persistently keeps the job data (image data) stored in the respective areas of the hard disk device even after processing, until the digital multi-functional device judges that the job data is no longer required and renews the FAT data so that newly supplied job data is written on the area which has been keeping the job data no longer required, or unless the job data no longer required is compulsively deleted from the area.

One example aimed at overcoming this problem can be found in Japanese Laid-Open Patent Application Tokukaihei 09-284572/1997 (published on Oct. 31, 1997, hereinafter referred to as a patent document 1), which discloses a digital multi-functional device with a function for preventing reproduction of the processed image, by compulsively deleting the area keeping the image data in the hard disk device, or by writing an irregular pattern generated by random numbers onto the area, when the processing of the data is completed.

However, according to the patent document 1, the digital multi-functional device takes a while to complete the foregoing measures for invalidating the image data by compulsively deleting the area keeping the image data, or by writing an irregular pattern generated by random numbers onto the area. Particularly, the processing for invalidation with respect to all image data storage areas throughout the hard disk device takes a long time to complete, and holds the user up to carry out other functions of the digital multi-functional device.

SUMMARY OF THE INVENTION

An object of the present invention is to provide an image processing device and an image processing method for carrying out processing of new image data without causing delay when the user requires urgent data processing during invalidation operation of image data stored in a memory, by suspending the invalidation operation by using a specific condition.

In order to solve the foregoing problems, an image processing device according to the present invention includes: image data inputting means for inputting image data; image data storing means for storing the image data inputted by the image data inputting means; image data processing means for processing the image data stored in the image data storing means; and image data invalidating means for performing invalidation of the image data stored in the image data storing means, and the image processing device further comprising: directing means for directing suspension of the invalidation performed by the image data invalidating means; and permitting means for permitting the suspension of the invalidation directed by the directing means.

Further, in order to solve the foregoing problems, an image processing method according to the present invention includes the steps of: (a) storing image data and carrying out required image processing with respect to the image data thus stored; and (b) performing invalidation of the image data thus processed so as to prevent reproduction of the image data; (c) when request of suspension of the invalidation is made after the step (b) is started, carrying out identification of a user who made the request of the invalidation; and (d) suspending the invalidation after confirming that the user who made the request of the invalidation is a certified user.

According to the present invention, the operation for invalidating the stored image data can be suspended by a specific condition even in the halfway of the operation. This arrangement allows the user to immediately bring the device back to a state for accepting new image data processing, thus efficiently performing processing (job) of image data without causing delay.

Additional objects, features, and strengths of the present invention will be made clear by the description below. Further, the advantages of the present invention will be evident from the following explanation in reference to the drawings.

DESCRIPTION OF THE EMBODIMENTS

One embodiment of the image processing device according to the present invention is described below with reference to Figures.

Figure 1:
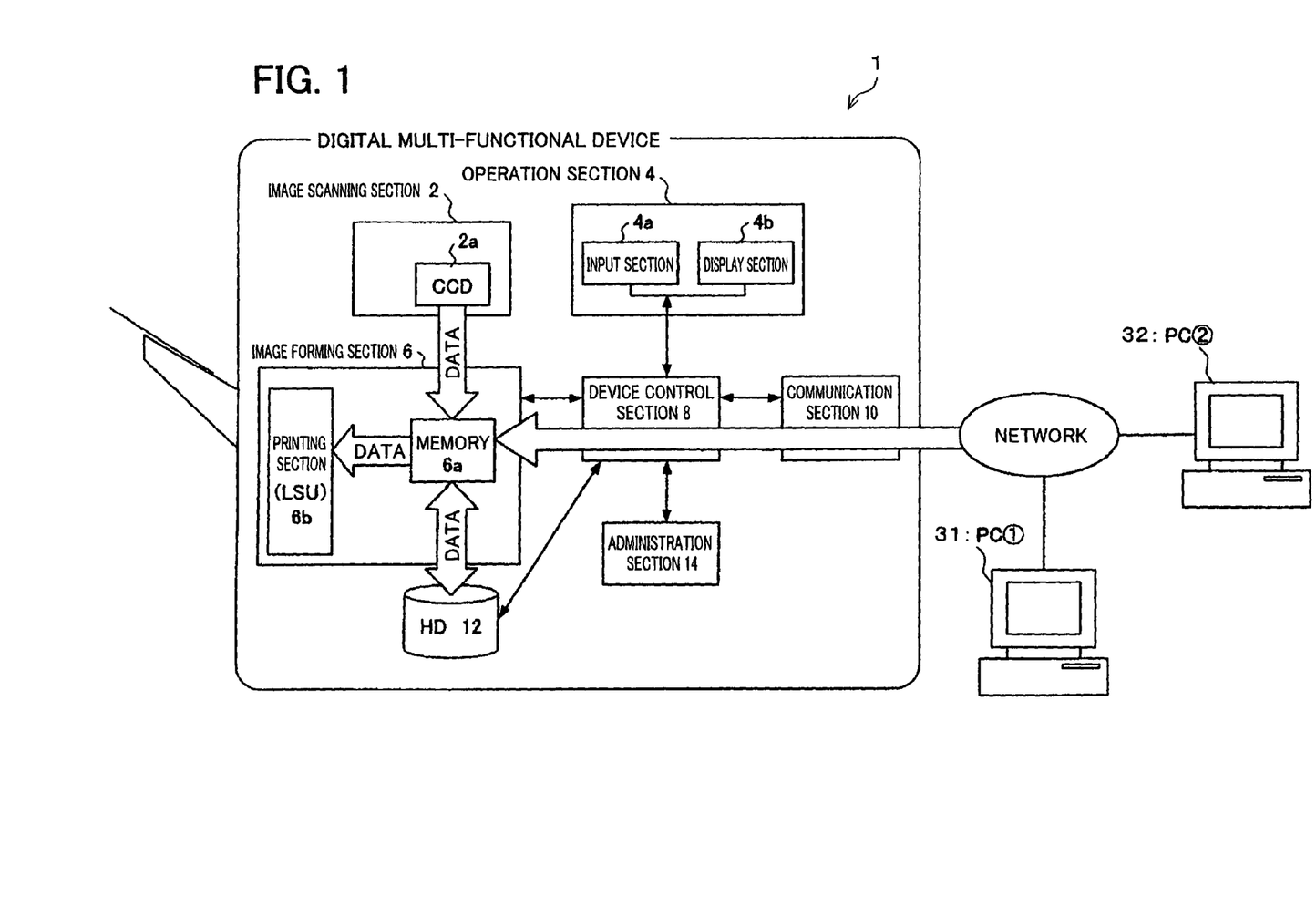
FIG. 1 is an explanatory view showing a schematic configuration of a digital multi-functional device as one embodiment of the image processing device according to the present invention.

FIG. 1 is an explanatory view showing a schematic configuration of a digital multi-functional device, as one embodiment of the image processing device according to the present invention. As shown in FIG. 1, a digital multi-functional device 1 according to one embodiment of the present invention includes an image scanning section 2, an operation section 4, an image forming section 6, a device control section 8, a communication section 10, a hard disk (HD) 12 and an administration section 14. Further, the digital multi-functional device 1 is connected to an external device, e.g., personal computers (PC) 31 and 32, via a network 11 which can be a LAN or the like.

The image scanning section 2 includes a CCD (Charge Coupled Device) scanning device (hereinafter referred to as a CCD) 2a for scanning image data. The image scanning section 2 operates as an image data inputting means (image data input section) for inputting the image data thus scanned. When a document is set on a scanning position of the image scanning section 2 by a user of the digital multi-functional device 1, and the input section 4a of the operation section 4 (described later) receives an instruction of image input (image scanning) by the user, the CCD 2a electrically scans the document image thus set in the scanning position, and then transmits the scanned image data to a memory 6a of the image forming section 6 (described later).

The operation section 4 includes an input section 4a and a display section 4b. The input section 4a includes tablets, keys and the like which are used as input keys, and the display section 4b includes a liquid crystal display (LCD) etc. The input section 4a accepts instructions of operation etc. from the user of the digital multi-functional device 1, and enforces, for example, operations of the respective constitutive sections of the digital multi-functional device 1, or input of various conditions such as a processing mode. In addition, the digital multi-functional device 1 of the present embodiment also operates as directing means for directing suspension of invalidation operation performed by an image data invalidating means (described later). The display section 4b adequately inform the user of necessary information, such as the condition or the setting of the digital multi-functional device, with its display. Note that, the operation section 4 will be more minutely described later with reference to FIGS. 1 and 2.

The image forming section 6 includes a volatile memory 6a (volatile memory) and a printing section 6a, e.g. a LSU (Laser Scanning Unit). The memory 6a stores data (image data) transmitted from the image scanning section 2, the hard disk 12 (described later) and the personal computers (PC) 31 and 32 which are connected to the digital multi-functional device 1 via the network 11. The printing section 6b reads out the data stored in the memory 6a, and outputs the data onto a recording medium, e.g. a recording paper. The image forming section 6 operates as image data outputting means (image data output section, a printing device) for outputting the image data stored in the hard disk 12 etc.

The device control section 8 supervises operation of the respective constitutive sections of the digital multi-functional device 1, while carrying out control throughout the digital multi-functional device 1 so as to ensure that the digital multi-function device 1 adequately performs required operation. More specifically, the respective constitutive sections of the digital multi-functional device 1 are controlled by the device control section 8, and the device control section 8 supervises instruction from the input section 4a made up of tablets and keys etc., while adequately informing (showing with a display in the display section 4b) the user of necessary information such as the condition of the digital multi-functional device 1 etc. via the display section 4b. The device control section 8 controls all operations performed in the digital multi-functional device 1 by referring to information in the administration section 14 which administrates all information regarding the respective constitutive sections.

Further, the device control section 8 operates as image data invalidating means (image data invalidation section) for invalidating the image data stored in an image data storing means (e.g. the hard disk 12, in this embodiment), together with the administration section 14. The device control section 8 also operates as permitting means for permitting suspension of the invalidation operation of the image data, which is directed by the directing means (input section 4a). When operating as the permitting means, the device control section 8 demands input of a predetermined key operator code and check the code by referring to the key operator code information administrated by the administration section 14, which is used as a proof that the user (operator) is a certified operator (e.g. the administrator of the digital multi-functional device 1), who has a right to stop the deletion (invalidation) operation of the image data. Thereafter, the device control section 8 further demands confirmation to carry out the deletion (approval of the invalidation operation) from the user through the key (input section 4a) displayed in the display section 4b, and then permits the suspension of the deletion (invalidation) operation.

Note that, in the present embodiment, the invalidation of image data designates an operation for preventing reproduction of the image data after the processing of the image data is completed in the digital multi-functional device 1 (image processing device). Such an operation is carried out by compulsively deleting an area in the hard disk device, where the image data exist, or by writing an irregular pattern, which is created by random numbers, onto the area. Note that, the administration section 14, and the invalidation operation of image data will be described later.

The communication section 10 is connected to such as the network 11 through a communication cable or the like, and controls communication between the digital multi-functional device 1 and an external network, more specifically, between the digital multi-functional device 1 and the PC 13 on the network 11. For example, the communication section 10 receives data from an external devices, such as the personal computer 31 or 32, connected to the network 11, and transmits the data on a page-by page basis to the volatile memory 6a of the image forming section 6 via the device control section 8. Further, the communication section 10 is capable of transmitting the document image data scanned by the image scanning section 2 to an arbitrary external device (personal computer) such as the personal computer 31 or 32 via the network 11. Further, the communication section 10 may be connected, for example, to a telephone line, in addition to being connected the network 11.

The hard disk 12 operates as image data storing means (image data storage section) for storing the image data inputted from the image data input means including the image data scanning section 2. The hard disk 12 constituting the image data storing means may be a storage device including a magnetic storage medium. The hard disk 12 carries out sending/receiving of the image data which has been inputted to the digital multi-functional device 1 to/from the memory 6a of the image forming section 6.

The administration section 14 administrates necessary information (to be more specific, information regarding the image data scanning section 2, operation section 4, the image forming section 6, the communication section 10 and the hard disk 12) for allowing the device control section 8 to control the respective constitutive sections of the digital multi-functional device 1, so as to carry out administration throughout the digital multi-functional device 1, while carrying out administration of the deletion of the data which is no longer required. Further, the administration section 14 stores/administrates information of the key operator code used for identification of the user (operator), upon invalidation (deletion) operation of the image data (described later).

As described above, the administration section 14 and the device control section 8 operate as image data invalidation means for invalidating the image data stored in the hard disk 12. In the present embodiment, the device control section 8 and the administration section 14 perform the invalidation of the image data with a function as image data deleting means (image data deletion section) for deleting the image data stored in the image data storing means (e.g. hard disk 12, in the present embodiment) by using an optional program. The device control section 8 and the administration section 14 further operate as deletion number controlling means (deletion number control section, invalidation number control section) for controlling the image data deleting means to carry out the deletion operation (invalidation operation) plural times with respect to the target image data, by using an optional program.

Apart from the function as a photocopier, the digital multi-functional device 1 according to the present embodiment has an image communication function, a scanner function, a printer function, and a facsimile function. Accordingly, the digital multi-functional device 1 carries out various processing with respect to the supplied image data by being a photocopier, a printer, a network scanner, or a facsimile device.

Firstly, the following will explain the photocopier function of the digital multi-functional device 1 according to the present embodiment.

When used as a photocopier, the digital multi-functional device 1 according to the present invention scans the image data of a document by the image scanning section 2 and then outputs the image data as a copy of the document via the image forming section 6.

As described above, the image scanning section 2 includes a CCD 2a which performs electronic scanning of the document image placed on the scanning position. The document data (image data) scanned by the CCD 2a is sent to the volatile memory 6a of the image forming section 6, as shown in FIG. 1, and is completed as an output image on the volatile memory 6a on a page-by-page basis. The volatile memory 6a transmits this data of the image output to the hard disk 12 on a page-by-page basis. The hard disk 12 temporarily stores image data transmitted from the volatile memory 6a. For a plurality of documents, such scanning and storing operations are repeated.

Thereafter, according to the processing mode selected through the operation section 4, the image data stored in the hard disk 12 is sequentially read out at appropriate timings, and then sent to the volatile memory 6a. The memory 6a transfers the image data to the printing section 6b at the same timing as the writing timing of the printing section 6a.

Further, when multiple copies of the scanned image data are requested, the image data, which has been stored in the hard disk 12 on a page-by-page basis, is sent to the volatile memory 6a according to the output mode selected through the operation section 4. In this case, the memory 6a repeats the transfer of the image data to the printing section 6b plural times according to the required number of copies, at the same timing as the writing timing of the printing section 6b.

Next, the following will explain the printer function of the digital multi-functional device 1 of the present invention.

When used as a printer, the digital multi-functional device 1 according to the present invention outputs the image data, which has been received from an external device (such as personal computers 31 or 32) by the image scanning section 2, from the image forming section 6 via the memory 6a etc.

The communication section 10 is, as described above, connected to the network 11, via a communication cable or the like, and receives image data from an external device (machine), such as personal computer 31 or 32, i.e., image data input source (external image data inputting means), which is also connected to the network 11, and then inputs the received image data to the digital multi-functional device 1. More specifically, when the digital multi-functional device 1 is used as a printer, the communication section 10 operates as the image data inputting means (image data inputting section) of the present embodiment. The image data received by the communication section 10 is sent to the volatile memory 6a as image output on a page-by-page basis via the device control section 8. The image data thus sent to the volatile memory 6a is temporarily stored in the hard disk 12.

Thereafter, according to the processing mode selected through the operation section 4, the image data stored in the hard disk 12 is sequentially read out at appropriate timings, and sent to the volatile memory 6a. Then, as with the function as a photocopier, the memory 6a transfers the image data to the printing section 6b.

The following will explain the network scanner function of the digital multi-functional device 1 according to the present embodiment.

When used as a network scanner, the digital multi-functional device 1 according to the present invention transmits the document image data, which has been scanned by the image scanning section 2, to an arbitrary personal computer (such as personal computer 31 or 32) by the communication section 10 via the network.

As with the case above, the digital multi-functional device 1 electronically scans the document image by the CCD 2a provided in the image scanning section 2. The scanned document data is then sent to the volatile memory 6a as a completed output image, and temporarily stored in the hard disk 12. The completed image data is then sent back from the hard disk 12 to the volatile memory 6a, and transmitted to the target destination via the communication section 10 after establishing the communication with the destination supplied through the operation section 4. Further, the communication section 10 is connected to a telephone line, in addition to being connected to the network. Therefore, the digital multi-functional device 1 of the present embodiment can be used as a facsimile device with the same operation as a network scanner.

Note that, the present embodiment explains a digital multi-functional device including the hard disk 12 as a storage device (image data storing means) for temporarily storing image data; however, the image data storing means of the present embodiment is not limited to the hard disk, and is also compatible with a device using a non-volatile memory, which can hold the stored image data even after removed from the main body of the digital multi-functional device 1 (image processing device), a memory with a backup function, or other storage devices (medium) using magnetic storage medium.

Figure 2:
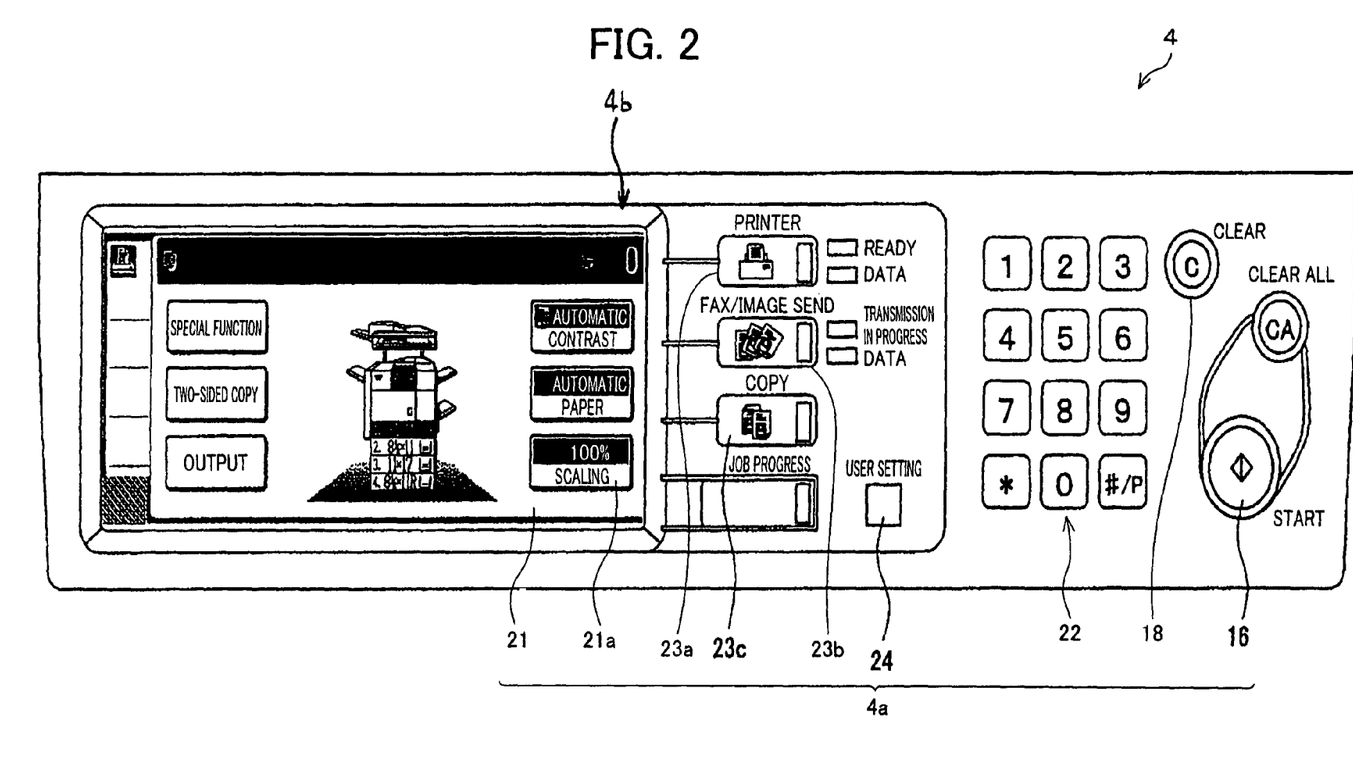
FIG. 2 is an explanatory view minutely showing the configuration of the operation section of the image processing device according to the present invention.

Next, with reference to FIGS. 1 and 2, the following will minutely explain the operation section 4 made up of the input section 4a and the display section 4b. FIG. 2 is an explanatory view minutely showing the configuration of the operation section 4 of the digital multi-functional device 1 according to the present embodiment.

As shown in FIG. 2, the operation section (operation panel) 4 of the digital multi-functional device 1 according to the present embodiment includes the input section 4a and the display section 4b, as described above with reference to FIG. 1.

The display section 4b is constituted of a dot matrix type liquid crystal panel which enables the digital multi-functional device 1 according to the present embodiment to minutely notify (inform) the user of necessary information by displaying the information.

The liquid crystal panel constituting the display section 4b includes a transparent tablet 21 as a touch panel on its surface, i.e., on the screen. The liquid crystal panel displays such as guidance information and a touch panel key 21 so that the user can operate the touch panel by pressing the touch panel key 21a (tablet 21) and also referring to the guidance information displayed in the liquid crystal panel. The information appeared as a result of pressing of the touch panel key 21a is then inputted to the digital multi-functional device 1 as instruction information. Namely, the tablet 21 also operates as a part of the input section 4a of the present embodiment.

In addition to the tablet 21 provided on the liquid crystal panel, the input section 4a is provided with plural keys adjacently disposed to the liquid crystal panel. As shown in FIG. 2, the plural keys including a start key 16 for an instruction to start operation of the digital multi-functional device 1 (e.g. starting photocopying); a clear all key 17 for suspending the operation currently in progress and bringing the current settings back to the initialization value again; a clear key 18 for modifying the current condition, for example, canceling the selected mode (processing mode); a ten key 22 for inputting numeric information such as number of copies, a telephone number, an ID number, or a secret code; a switching keys 23a 23b 23c for switching the processing mode between a printer mode, a facsimile/image transmission mode, a photocopy mode; a user setting key 24 and the like.

Next, the following will explain a security system mounted in the digital multi-functional device 1 according to the present embodiment.

Briefly, the digital multi-functional device 1 stores the image data in the image data storing means, i.e., the hard disk 12 according to the processing (one of the foregoing functions) currently in progress. Here, the image data is encoded via the device control section 8 before being stored in the hard disk 12, and the encoded data is decoded when read out from the hard disk 12, and then, the data (image data) is sent to the printing section 6b so as to be subjected to output processing such as printing. This manner can improve security level. Thereafter, the stored image data is deleted (invalidated) from the hard disk 12 when the device control section 8 judges that the stored image data is no longer required. Here, in order to ensure invalidation of the data, the deletion operation is repeated a predetermined number of times according to the security level.

Note that, the following will explain the invalidation operation in the photocopying mode in which the scanned document image is outputted from the printing section 6b as a record; however, the invalidation operation can be carried out with the same procedures when the digital multi-functional device 1 is used as a printer, a facsimile or a network scanner for transmitting the scanned image data. The digital multi-functional device 1 according to the present embodiment has a particular function of deleting the image data from the hard disk device 12 when the device control section 8 judges that the stored image data is no longer required.

Figure 11:
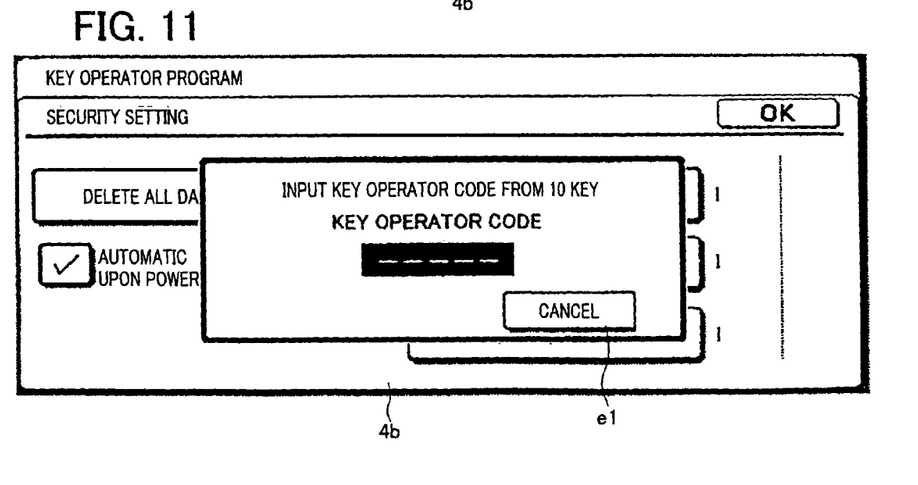
FIG. 11 is an explanatory view showing a screen for demanding input of key operator code, displayed in a liquid crystal panel of the operation section shown in FIG. 2.
Figure 12:
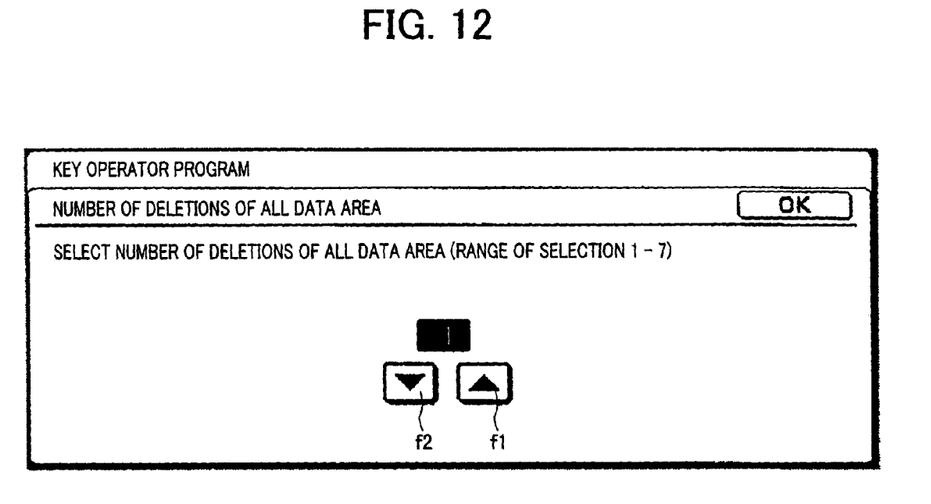
FIG. 12 is an explanatory view showing a screen for setting "number of deletions for the whole data area, displayed in a liquid crystal panel of the operation section shown in FIG. 2.
Figure 13:
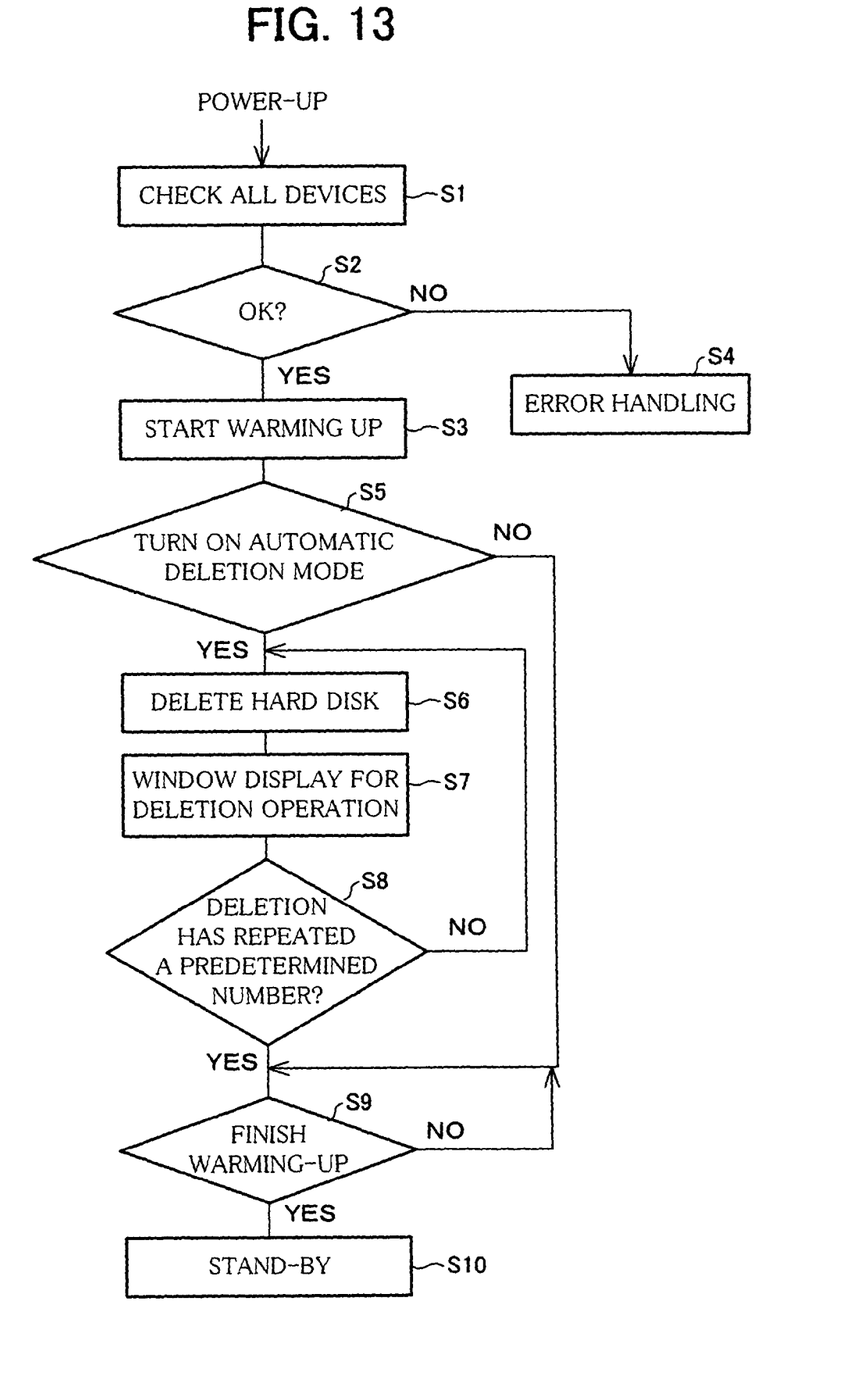
FIG. 13 is a flow chart for explaining a flow of processing in a photocopy mode.
Figure 14:
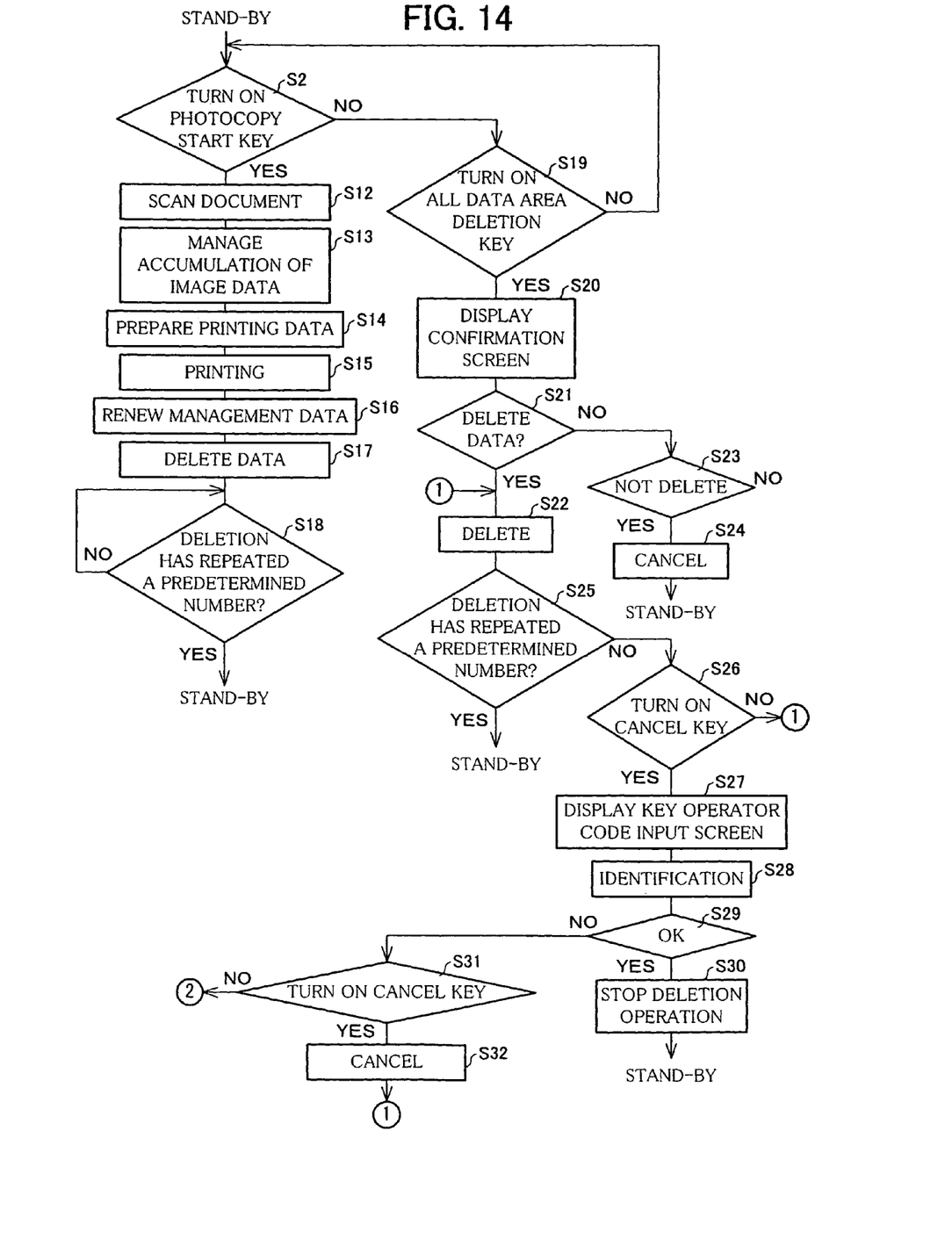
FIG. 14 is another flow chart for explaining a flow of processing in the photocopy mode.

FIGS. 3 through 12 are explanatory views showing screens displayed in the display section 4b of FIG. 2, which is constituted of a liquid crystal panel. These explanatory views show transition of display state of the display section 4b during the procedures of deletion (invalidating) of unwanted image data. The deletion is performed by activating "image data deletion operation" mode which deletes the image data temporarily stored in the hard disk 12 according to the security level. Further, FIGS. 13 and 14 are flow charts showing a series of procedures, in the digital multi-functional device according to the present embodiment, for carrying out photocopying operation and thereafter deleting the image data from the hard disk 12.

Figure 3:
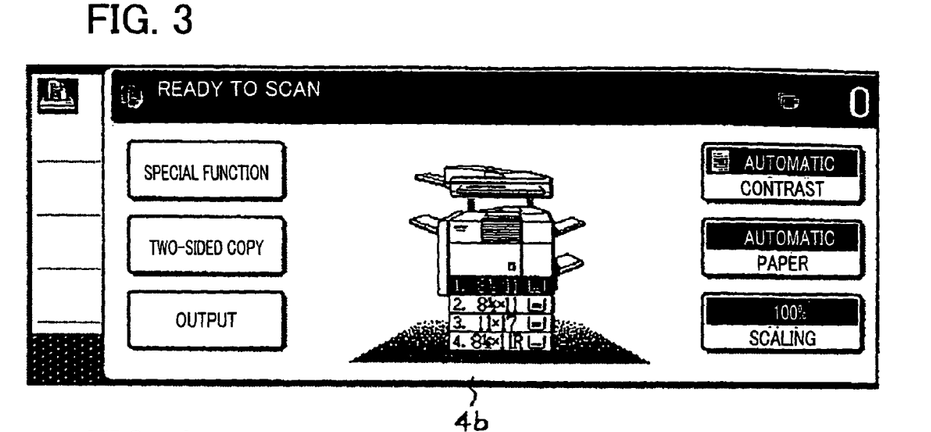
FIG. 3 is an explanatory view minutely showing a general screen displayed in a liquid crystal panel of the operation section shown in FIG. 2.

FIG. 3 is a display screen of the display section 4b in a state (normal state) where the "image data deletion operation" mode is not yet effective.

Though the digital multi-functional device 1 is previously provided with the "image data deletion operation" mode as one of the functions, the mode is not activated until input of a product key in terms of security of the document data etc. in each installation place. More specifically, the function of the "image data deletion operation" is mounted in the digital multi-functional device 1 in advance; however, it selectively becomes effective by input of the product key.

Figure 4:
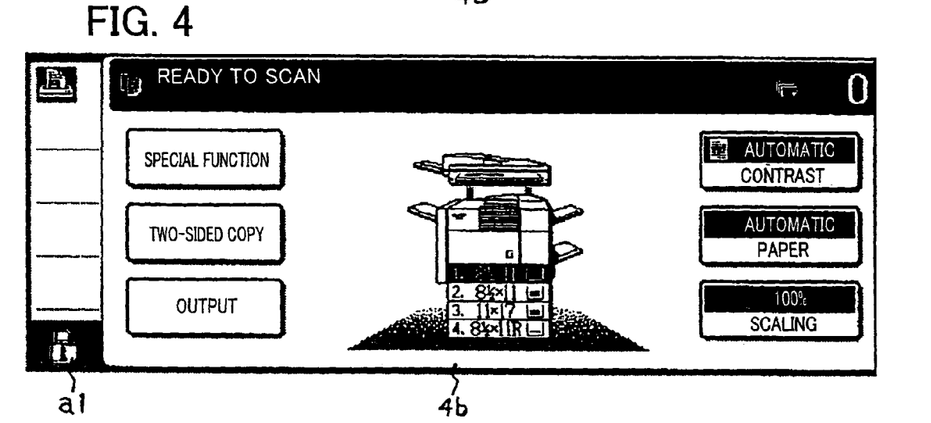
FIG. 4 is an explanatory view showing the screen displayed in a liquid crystal panel of the operation section shown in FIG. 2, in a state of displaying an icon which indicates that "image data deletion" can be carried out.

FIG. 4 is a drawing showing an icon a1 displayed at the lower left of the screen, for indicating that the "image data deletion operation" mode is ready to operate. With this display of icon a1, the user is informed that "the image data deletion operation" mode has become effective by the input of the product key.

Figure 5:
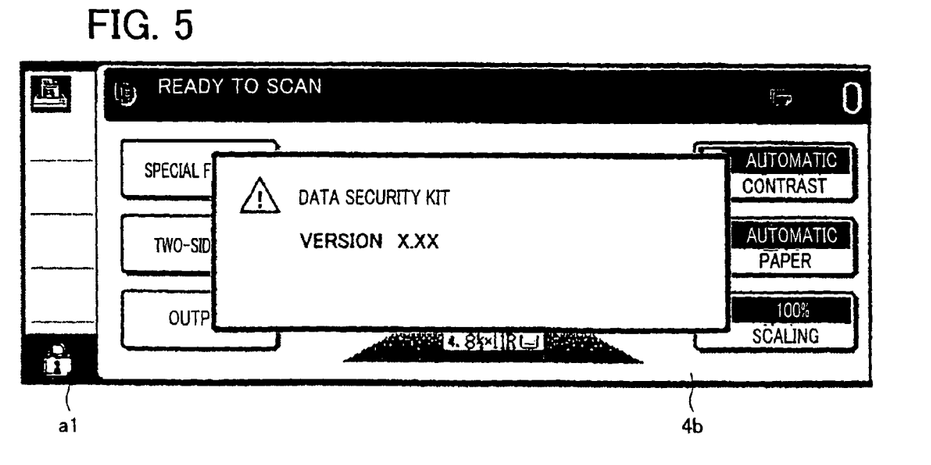
FIG. 5 is an explanatory view showing a screen showing version information, displayed in a liquid crystal panel of the operation section shown in FIG. 2.

Further, by pressing (touching) the portion having the icon a1 at the lower left of the display screen of FIG. 4 when "the image data deletion operation" is not activated (the device is standby), the screen changes its display to the one shown in FIG. 5. This display screen shows such as the version information of the security kit, at substantially the center of the display.

Note that, the "image data deletion function" is a "data security kit", which is an optional function of the digital multi-functional device 1, and is shown in the window display as a "data security kit". In this display, the user can confirm the contents or versions of the "data security kit" and the "image data deletion function".

Figure 6:
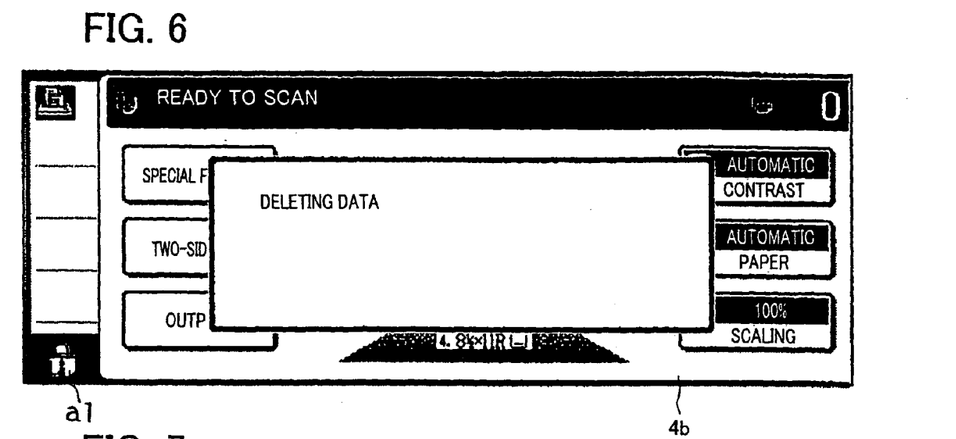
FIG. 6 is an explanatory view showing an operation screen for "image data deletion", displayed in a liquid crystal panel of the operation section shown in FIG. 2.

Further, when the "image data deletion operation" mode is operated by finishing or canceling the job (deleting the data in the hard disk 12), the screen shows a window telling that the data deletion operation is currently in progress, at substantially the center of the display.

Figure 7:
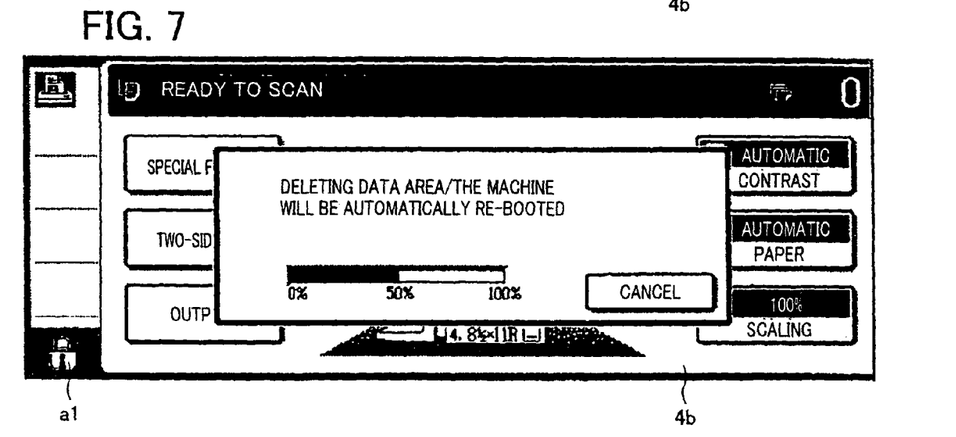
FIG. 7 is an explanatory view showing a screen for confirming the operation for "image data deletion", displayed in a liquid crystal panel of the operation section shown in FIG. 2.

Further, here, by pressing (touching) the icon a1 displayed at the lower right of the screen, the screen changes its display to the one shown in FIG. 7. This screen displays a window at substantially the center of the display, telling that the deletion of the image data in the hard disk 12 is currently in progress by the "image data deletion operation" mode, together with the level of the progress. This allows the user to confirm the progress of the operation of the "image data deletion operation".

Further, the screen may use a particular state of display, for example, a flashing icon, to indicate that the deletion of the image data in the hard disk 12 is currently in progress so that the user can recognize at a glance that the "image data deletion operation" is in progress.

Figure 8:
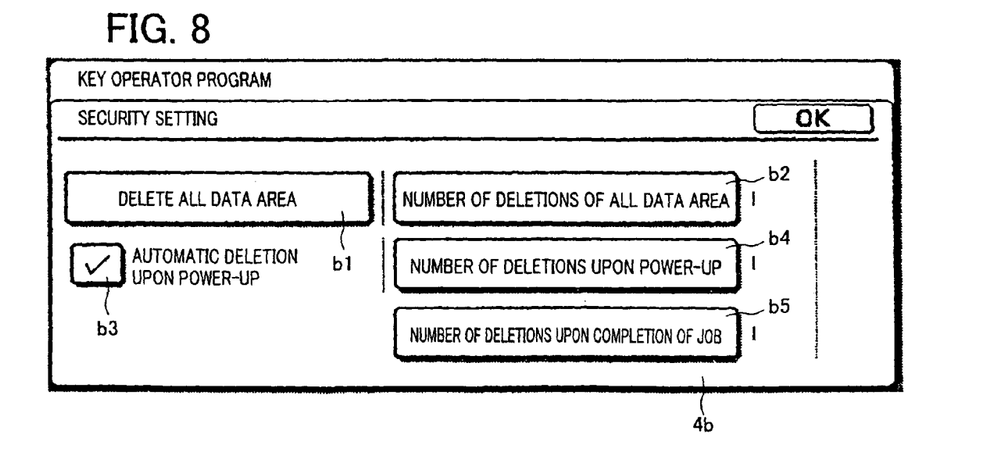
FIG. 8 is an explanatory view showing a screen for setting the details, displayed in a liquid crystal panel of the operation section shown in FIG. 2.

FIG. 8 shows a screen for setting the details, which is used for arbitrarily setting the number of deletions (invalidations) of image data stored in the hard disk 12 by the "image data deletion operation" mode, according to the security level regarding document data in each installation place, or for directing to start the "image data deletion operation" so as to compulsively delete (invalid) the image data stored in the hard disk 12.

By thus setting an appropriate number of deletion operations with the foregoing screen according to the security level, the deletion of unwanted image data can be performed plural times, thus meeting the security level of the installation place. Accordingly, it is possible to minimize decrease of processing level of image data due to improvement of the security level.

Further, it is possible to delete (invalidate) the image data stored in the hard disk 12 at an arbitrary timing, and therefore effective to handle an important document data.

The following will briefly explain the respective functions of the digital multi-functional device 1. Firstly, an "all data area deletion" mode is explained.

Figure 9:
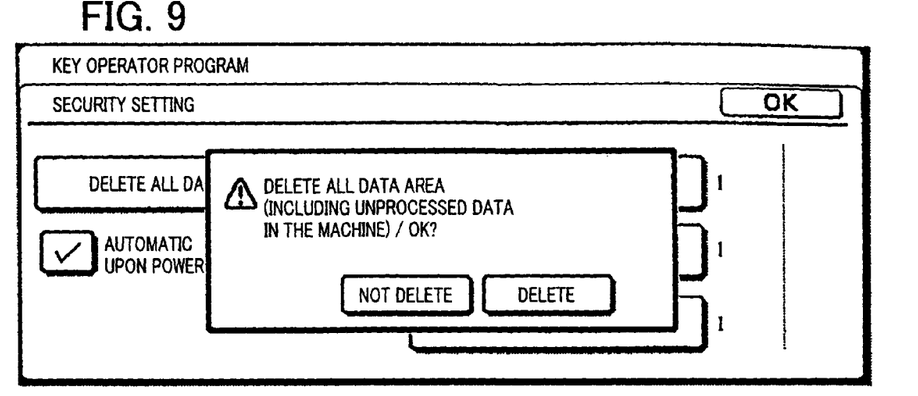
FIG. 9 is an explanatory view showing a screen for confirming deletion, displayed in a liquid crystal panel of the operation section shown in FIG. 2.
Figure 10:
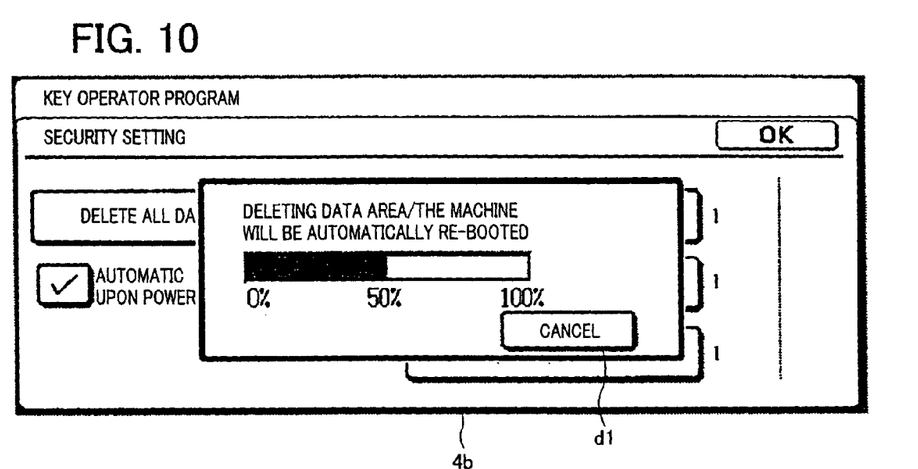
FIG. 10 is an explanatory view showing a screen indicating progress of data deletion operation, displayed in a liquid crystal panel of the operation section shown in FIG. 2.

When the key b1 of "delete all data area" displayed in the upper left of the details setting screen shown in FIG. 8 is pressed, the device changes its operation to the deletion operation of the data in the hard disk 12. Here, as shown in FIG. 9, a confirmation window (deletion confirmation screen) appears in substantially the center of the display screen, which allows the user to start data deletion with respect to the hard disk 12 by pressing the "delete" key c1. FIG. 10 shows a screen for indicating the progress level of the data deletion operation for the hard disk 12.

Note that, the data deletion operation with respect to the hard disk 12 can be suspended by pressing the "cancel" key d1 provided in the window display of FIG. 10. This key is used for suspending the data deletion operation for the hard disk 12, which consumes a long time to complete, and carrying out an urgent image data processing. Specifically, the digital multi-functional device 1 of the present embodiment allows the user to suspend image data deletion (invalidation) operation by using the "cancel" key d1, which is displayed during the deletion operation.

However, the suspension of the data deletion operation is not desirable in terms of security. Therefore, when the device control section 8 recognizes pressing of the "cancel" key d1 of FIG. 10 by the user, the device changes its display to the screen shown in FIG. 11 so as to demand input of a key operator code, which is used for identifying the user of the multi-functional device 1, so that only a specific user (administrator), such as the administrator of the multi-functional device 1, can carry out suspension instruction of the deletion (invalidation) operation.

Then, the device identifies the inputted key operator code with the predetermined code previously recognized by the administration section 14. After confirming that the suspension operation is instructed by a specific user, the device suspends the data deletion operation for the hard disk 12.

Further, the screen shown in FIG. 8 includes a "number of deletions of all data area" key b2 on the right of the "delete all data area" key b1, which allows the user to select the number of the deletion operations of all data area in a range from 1 to 7, for example. The selected number (the default value is 1) is also displayed next to the "number of deletions of all data area" key b2. When the "number of deletions of all data area" key b2 is pressed, the screen for setting the number of deletion operations of all data area, which is shown in FIG. 12, appears so as to allow the user to input an arbitrary number of operations by using the "up" key f1 and the "down" key f2. Then, when the "delete all data area" key b1 is pressed, the data deletion operation for the hard disk 12 is repeated according to the selected number.

Next, the following will explain an "automatic deletion upon power-up" mode.

When a "automatic deletion upon power-up" key b3, which is displayed in the middle of the details setting screen of FIG. 8, is pressed, a check symbol "√" appears in the key, indicating that the device has selected an automatic data deletion mode in which the data in the hard disk 12 is automatically deleted whenever the power is turned on.

The screen shown in FIG. 8 further include a "number of deletions upon power-up" key b4 on the right of the "automatic deletion upon power-up" key b3, which allows the user to select the number of the automatic deletion operations upon power-up in a range from 1 to 7, for example. The selected number is also displayed next to the "number of deletions upon power-up" key b4. Note that, the automatic data deletion upon power-up mode is not set in a default state, and therefore the display of the number of operations shows 0 in the default state.

When the "number of deletions upon power-up" key b4 is pressed, the screen for setting the number of deletion operations of all data area, which is shown in FIG. 12, appears so as to allow the user to input an arbitrary number of operations by using the "up" key f1 and the "down" key f2.

Next, the following will explain an "automatic deletion upon completion of job" mode.

By pressing the "number of deletions upon completion of job" key d5 which is displayed on the bottom of the details setting screen shown in FIG. 8, the user can select the number for carrying out "deletions upon completion of job" in which the device deletes the data from the hard disk 12 each time the job (processing) of the data is completed.

When the "number of deletions upon completion of job" key d5 is pressed, the screen for setting the number of deletion operations of all data area, which is shown in FIG. 12, appears so as to allow the user to select the "number of deletions upon completion of job", by inputting an arbitrary number of operations with the "up" key f1 and the "down" key f2, in a range from 1 to 7, for example. Further, the selected number (the default value is 1) is also displayed next to the "number of deletions upon completion of job" key d5. Exceptionally, this "deletion operation upon completion of job" mode is automatically set when the operation of the security kit ("image data deletion operation") is approved by the input of the product key, which is described above.

As has been explained, by optionally providing the "data security kit" in terms of security, and offering a circumstance allowing the operation of the "image data deletion function", the digital multi-functional device 1 according to the present embodiment is capable of selecting the number of enforcements of "image data deletion function" according to the security level of the installation place. Further, the digital multi-functional device 1 is also capable of appropriately enforcing data deletion for the hard disk 12 according to the circumstances.

Finally, an example of the operation is described with a flow of operations in the photocopying function, referring to the flow charts shown in FIGS. 13 and 14.

Upon power-up (ON) of the digital multi-functional device 1, the device control section 8 examines the respective constitutive devices (the respective sections constituting the device) of the digital multi-functional device 1 by using the information stored (administrated) by the administration section 14 (S1). Then, in the step S2, the device control section 8 judges weather or not there are any problems in the respective devices referring to the result of examination in S1. If the device control section 8 judges that there are no problems in the respective constitutive devices (Y in S2), the sequence goes to S3 in which the device start warming up to be ready for a predetermined operation. If the device control section 8 judges that there is a problem among the constitutive devices (N in S2), the sequence goes to S4 in which the device control section 8 carries out error handling, for example, by displaying a window in the display section 4b, indicating that the problem (error) has been found, and also confirming user's recognition of the problem (S4).

Next, when the device is maintaining the warming-up started in the step S3 without any particular problems, the device control section 8 judges that weather the "automatic deletion upon power-up" mode, which initializes the hard disk 12 upon each power-up, is set (ON) or not (S5). If the device control section 8 judges that the "automatic deletion upon power-up" mode is set (ON) (Y in S5), the device control section 8 starts initializing the hard disk 12 (S6), and also displays a window in the display screen of the display section 4b for showing the progress of the initialization (S7).

Further, in the step S8, when the device control section 8 judges that the data deletion has not been repeated the predetermined number (N in S8), which is previously selected by using the setting screens shown in FIGS. 8 and 12 (N in S8), the sequence goes back to the step S6 until the data deletion operation of the hard disk 12 is repeated the predetermined number (N in S8).

Then, when the device control section 8 judges that the data deletion has been repeated the predetermined number (Y in S8), the device control section 8 finishes the initialization of the hard disk device 12, and the sequence goes to the step S9.

In case where the device control section 8 judges that the "automatic deletion upon power-up" mode is not set (ON) in the step S5 (N in S5), the sequence goes straight to the step S9.

In the step S9, the device control section 8 judges weather or not the display screen of the control panel is back in the original state, meaning that the warming-up is completed (S9). The sequence goes to S10 when the device control section 8 judges that the warming-up is completed (Y in S9) in which the digital multi-functional device 1 is back in a standby state to be ready for instruction of the next job. On the other hand, when the device control section 8 judges that the warming-up is not completed (N in S9), the sequence goes back to the step S5, and the digital multi-functional device 1 repeats the operations from the step S5 until the warming-up is completed.

In the digital multi-functional device 1 back in the standby state, a document is placed on the setting position on the image scanning section 2, and the start key 16 as a command for starting photocopying is pressed. With this operation, the device control section 8 receives the command for starting photocopying (Y in S11). Then, the device control section 8 controls the CCD 2a of the image scanning section 2 to electronically scan the document on the setting position so as to create an output image on the volatile memory 6a on a page-by page basis (S12). The output image created on the volatile memory 6a is then sent to the hard disk 12. These output images are accumulated in the hard disk 12, and the administration section 14 receives information (such as FAT data) regarding the image data stored in the hard disk 12 so as to administrate the information (S 13).

Next, the image data stored in the hard disk 12 is read out to the memory 6a as printing data, according to recording timing (S14), and further transfers from the memory 6a to the printing section 6b (LSU) and printed by the printing section (printer) (S15).

Further, when the device control section 8 judges that the image data has been printed by the printing section 6b, the operation is completed and the administration data such as FAT data is renewed (S16). Further, when the device control section 8 judges that the series of printing operations is completed, the device control section 8 and the administration section 14 carries out data deletion operation with respect to the storage area used for the printing operation in the image data stored in the hard disk 12 (S17). Here, as with the flow chart shown in FIG. 13, the initialization (data deletion) of the hard disk 12 is repeated a predetermined number, which is previously selected by using the setting screens shown in FIGS. 8 and 12 (S18), and when the device control section 8 judges that the initialization has been repeated the predetermined times (Y in S18), the digital multi-functional device 1 goes back to the standby to be ready for instruction of the next job.

When the device control section 8 judges that the "delete all data area" key b1 shown in FIG. 8 is pressed (ON) in the standby state, i.e., when the start key 16 (a key for starting photocopying) is not ON in the step S11 (Y in S19), the device control section 8 displays a window (the display screen for confirming execution of deletion operation shown in FIG. 9) in the display section 4b, for allowing the user who made the instruction (S20) to confirm the execution of the deletion. When the device control section 8 judges that the "delete" key c1 shown in FIG. 9 is pressed (ON) (Y in S21), the device control section 8 and the administration section 14 start deletion operation of all image data in the hard disk 12 (S22). On the other hand, when the device control section 8 judges that the "delete" key c1 shown in FIG. 9 is not pressed (ON) (N in S21), and the "not delete" key c2 is pressed (ON) instead (Y in S23), the sequence goes to S24 for canceling the "delete all data area" mode and the related window display screens, so that the digital multi-functional device 1 goes back to the standby state to be ready for the next instruction. Further, when the device control section 8 does not recognize that the "not delete" key c2 shown in FIG. 9 is pressed (ON) (N in S21), the sequence goes back to S21 and the device control section 8 again judges weather or not the "delete" key c1 is pressed (ON).

When the device control section 8 recognizes that the "cancel" key d1 in the window display (FIG. 10) is pressed (ON) (S26) while the "delete all data area" operation is repeated the predetermined times (S22, Y in S25) by the instruction of pressing the "delete" key c1 in the step S21, the device control section 8 displays the window screen shown in FIG. 11 so as to demand input of the predetermined key operator code which is known only by a specific user, and identifies the inputted code with the key operator code information administrated by the administration section 14 to be used as a proof that the user (operator) is a certified operator (e.g. the administrator of the digital multi-functional device 1) who has a right to stop the deletion (invalidation) of the image data. After confirming that the user is the certified user (Y in S29), the device control section 8 suspends of the deletion operation of all data area of the hard disk 12 (S30), and the digital multi-functional device 1 goes back to the standby state to be ready for the next input of image data.

This situation is the same as that where the "delete all data area" operation is completed (Y in S25) after being repeated the predetermined number of times, which is selected in the step S25, and therefore, the display screen in the display section 4b shows the default operation screen (FIG. 3), meaning that the digital multi-functional device 1 is back in the standby state to wait for new image data, and next instruction regarding the new image data.

In case where the inputted key operator code is not identified with the predetermined key operator code (N in S29), the device control section 8 keeps demanding the re-input of the key operator code (S27) until the "cancel" key e1 shown in FIG. 11 is pressed (Y in S31), or the required key operator code is inputted (Y in S29). Further, when the "cancel" key e1 shown in FIG. 11 is pressed (ON) (Y in S31), the suspension mode of the "delete all data area" operation and the related window display screens are cancelled (S32), so that the sequence goes back to S22 and the digital multi-functional device 1 continues the data deletion operation for all data in the hard disk 12.

With the foregoing procedures, the present invention carries out deletion (invalidation) of image data in the hard disk 12, and also suspends the deletion (invalidation) operation of the image data in the hard disk 12 by a specific condition. This arrangement allows the user to preferentially carry out urgent image data processing even during the deletion operation. Note that, the foregoing procedures allow a partial addition/modification within the spirit of the present invention.

As described, in the image data invalidation (deletion) operation with respect to such as the hard disk 12 (image data storing means), so as to maintain security of the digital multi-functional device 1, the present invention also offers a function for suspending the invalidation operation after the invalidation (deletion) operation is started, by inputting a predetermined key operator code, which is a proof that the user (operator) is a certified operator (e.g. the administrator of the digital multi-functional device 1), who has a right to stop the invalidation (deletion) operation of the image data. On this account, the digital multi-functional device 1 can maintain the security while also accepting urgent photocopying under the authority of the administrator of the device. Therefore, it is possible to provide the digital multi-functional device 1 which can maintain the desired security level while accepting urgent requests of processing.

Accordingly, the present invention offers improved security level by deleting the target image data from the image data storing means, or invalidating the image data by wiring an irregular pattern on the image data; and further offers a function for directing suspension of the deletion (invalidation) operation under the authority of a certified user (the administrator of the device), so that the device can be brought back to a state even during the deletion operation, for accepting urgent image data processing. With this function, image data processing can be efficiently carried out.

Further, according to the present invention, since the image data invalidating means continues the invalidation operation until the suspension of the invalidation is permitted, the invalidation of the image data stored in the magnetic storage device, such as a hard disk, can be maintained to a certain extent, thus interfering reproduction of the image data, and improving security level.

Further, according to the present invention, the permitting means permits the suspension operation after obtaining approval from a certified user for suspending the operation, such as an administrator of the device. On this account, only a specific administrator (the certified user) can judge whether or not the suspension operation should be enforced in order to carry out new image data processing during the invalidation operation of the image data in the hard disk. With this arrangement, the image processing device (the digital multi-functional device 1, in the described embodiment) of the present invention can maintain the security level, while efficiently carrying out urgent data processing of a new job without causing delay of the processing.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing device, comprising:
image data inputting means for inputting image data;
image data storing means for storing the image data inputted by the image data inputting means;
image data processing means for processing the image data stored in the image data storing means; and
image data invalidating means for performing invalidation of all of the image data stored in the image data storing means, the image processing device further comprising:
directing means for directing suspension of the invalidation performed by the image data invalidating means while the invalidation is being performed; and permitting means for permitting the suspension of the invalidation being performed, in response to a request of the suspension of the invalidation by the directing means, after a predetermined code is inputted by a user, the predetermined code being matched with a code administrated in the image processing device to confirm that the user who requested the suspension of the invalidation is a certified user, and the permitting means then suspends the invalidation being performed in all areas of the image data storing means, wherein the invalidation being performed cannot be suspended unless approved by the certified user by entry of the predetermined code, thus maintaining a security level and allowing urgent data processing of a new job to be carried out.

2. The image processing device as set forth in claim 1, wherein:

the image data invalidating means continues the invalidation until the suspension of the invalidation is permitted.

3. The image processing device as set forth in claim 1, wherein:

the permitting means permits the suspension of the invalidation after obtaining approval by an administrator who administrates the image processing device.

4. The image processing device as set forth in claim 1, wherein:

the permitting means permits the suspension of the invalidation by input of a key operator code.

5. An image processing method, comprising the steps of:

(a) storing image data and carrying out required image processing with respect to the image data thus stored; and (b) performing invalidation of all of the image data thus processed so as to prevent reproduction of the image data;

(c) when request of suspension of the invalidation is made while the invalidation is being performed after the step (b) is started, carrying out identification of a user who made the request of the invalidation; and (d) suspending the invalidation being performed in all areas of an image data storing means of an image processing device after inputting a predetermined code that is matched with a code administrated in the image processing device to confirm that the user who made the request of the invalidation is a certified user, wherein the invalidation being performed cannot be suspended unless approved by the certified user by entry of the predetermined code, thus maintaining a security level and allowing urgent data processing of a new job to be carried out.

6. The image processing method as set forth in claim 5, wherein:

in the step (c), the identification of the user who made the request of the invalidation is carried out by input of a key operator code.

7. The image processing device as set forth in claim 1, further comprising a display indicating that the invalidation of the image data is in progress.

8. The image processing method as set forth in claim 5, further comprising the step of providing a display to indicate that the invalidation of the image data is in progress.

* * * * *